United States Patent [19]

van der Lely

[11] 4,251,981
[45] Feb. 24, 1981

[54] MOWING MACHINES

[76] Inventor: Cornelis van der Lely, 7, Brüschenrain, Zug, Switzerland

[21] Appl. No.: 949,035

[22] Filed: Oct. 6, 1978

[30] Foreign Application Priority Data

Oct. 6, 1977 [NL] Netherlands ............... 7710957

[51] Int. Cl.³ .............. A01D 43/00; A01D 35/26
[52] U.S. Cl. .................... 56/192; 56/17.5; 56/291; 56/295
[58] Field of Search .............. 56/6, 13.6, 295, 192, 56/291, 290

[56] References Cited

U.S. PATENT DOCUMENTS

| | | | |
|---|---|---|---|
| 2,722,955 | 11/1955 | Roy et al. | 56/17.5 |
| 3,049,852 | 8/1962 | Jacobson | 56/157 |
| 3,500,622 | 3/1970 | Bowen | 56/295 |
| 3,623,300 | 11/1971 | Konig et al. | 56/6 |
| 3,667,200 | 6/1972 | Pool et al. | 56/10.4 |
| 3,676,988 | 7/1972 | Hauser-Lienhard | 56/192 |
| 3,835,630 | 9/1974 | von der Au | 56/295 |
| 4,027,463 | 6/1977 | Takahashi | 56/295 |
| 4,094,132 | 6/1978 | Diecoene et al. | 56/192 |
| 4,114,354 | 9/1978 | Morris | 56/295 |

FOREIGN PATENT DOCUMENTS

| | | | |
|---|---|---|---|
| 1946321 | 10/1968 | Fed. Rep. of Germany | 56/13.6 |
| 6403851 | 4/1964 | Netherlands | 56/291 |

Primary Examiner—Paul J. Hirsch

Attorney, Agent, or Firm—Penrose Lucas Albright

[57] ABSTRACT

Two embodiments of mowing machines wherein the cutters are resiliently deflectable to within a guard. In both embodiments, the frame of the mowing machine is connected to a tractor and extends laterally therefrom, the mowers being powered from the power take-off of the tractor by a train of gears, shafts and connecting universal joints. In one embodiment, the mowers rotate about vertical axes with the cutters being rotated on elongated resilient shafts which are also rotated about a common main axis from which they are spaced. The cutters are supported near the ground by holders which permit resilient deflection of the cutters' shafts into guards supported by the mowers when the cutters encounter obstacles or otherwise are subjected to forces which cause them to deflect. In the other embodiment, the cutters are mounted on an endless member such as a chain which runs around laterally spaced apart wheels such as sprockets which are mounted on carrier plates which are connected by a rod which is spring-biased. The endless member of the cutter is thus deflectable whereby it is withdrawn within a guard structure when encountering obstacles and like deflecting forces. Tines rotate over the cutters in both embodiments about vertical axes in the first and about a horizontal axis in the second to move cut crop to the rear into a swath, swath-forming members being supported to extend to the rear in the first embodiment.

35 Claims, 8 Drawing Figures

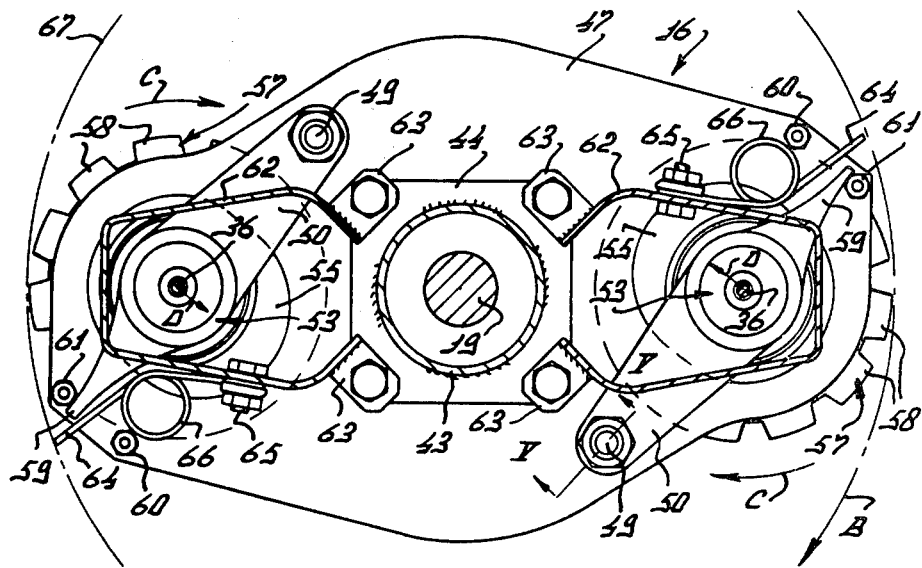
FIG. 3
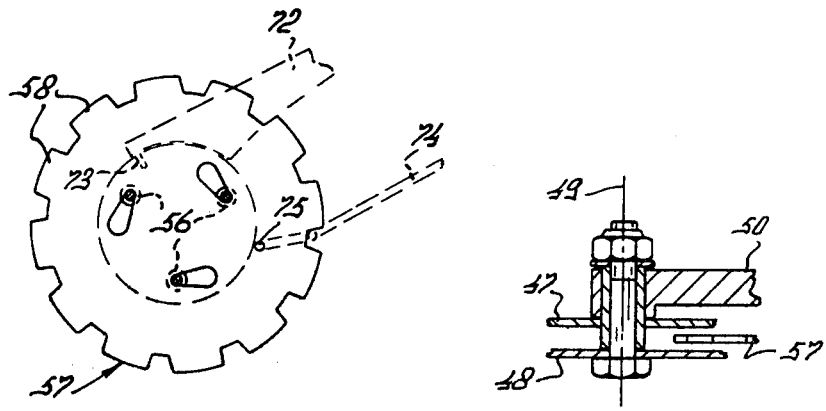
FIG. 4
FIG. 5

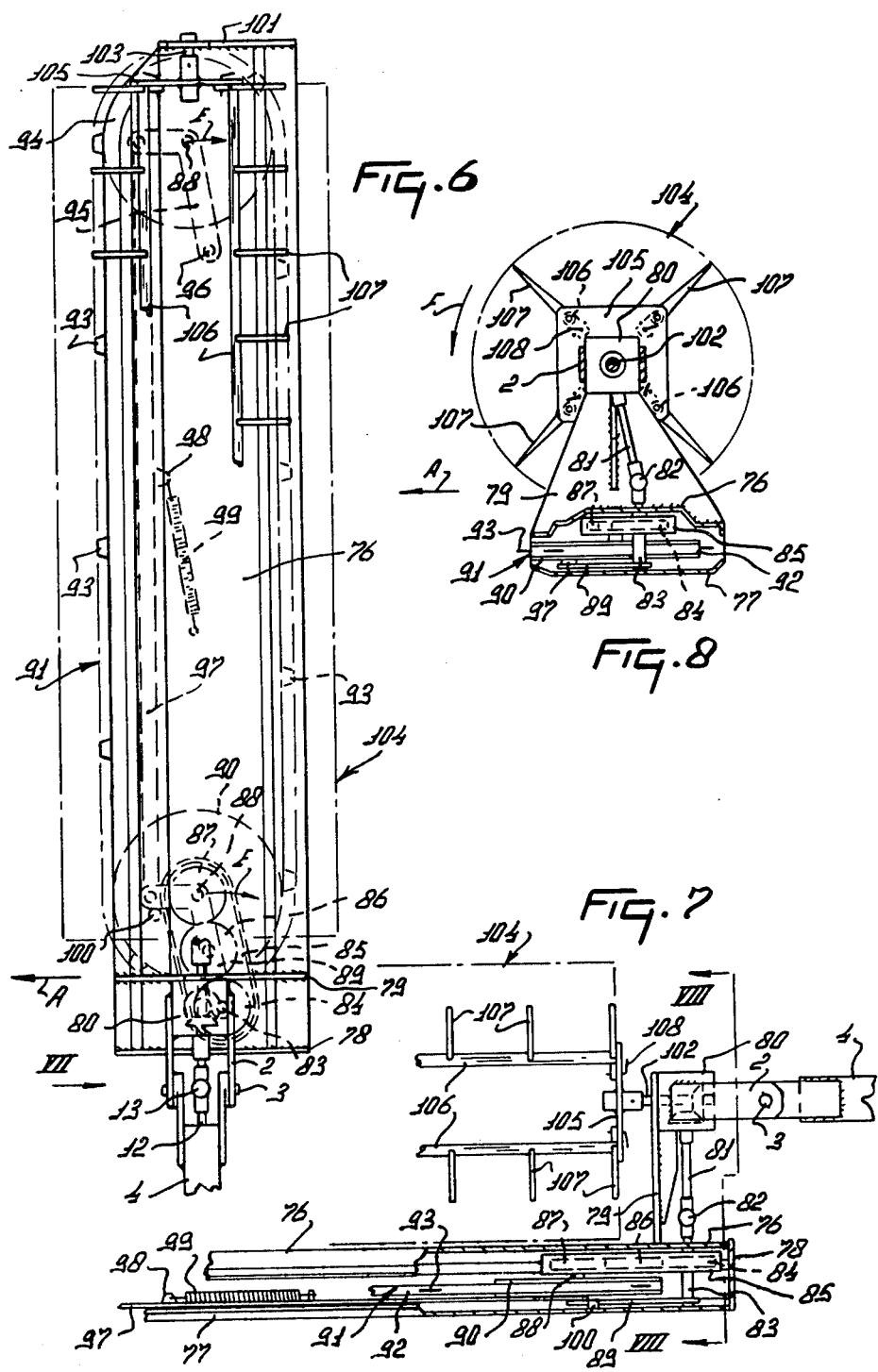

MOWING MACHINES

SUMMARY OF THE INVENTION

This invention relates to mowing machines.

According to a first aspect of the present invention there is provided a mowing machine comprising a mowing element which is drivable about an upwardly extending axis and is movable between a first position and a second position, and a guard member, the operative portion of the mowing element, in the first position, being disposed outwardly of the guard member and, in the second position, being disposed within the outer periphery of the guard member.

According to a second aspect of the present invention there is provided a mowing machine comprising a mowing element which is drivable about an upwardly extending axis, a guard member being provided, adjacent the mowing elements, which is asymmetrical with respect to all planes containing the axis of the mowing element.

According to a third aspect of the present invention there is provided a mowing machine comprising a mowing element which is mounted on a drive shaft to be driven about an upwardly extending axis, the upper portion of the drive shaft being movable with respect to the lower portion.

According to a fourth aspect of the present invention there is provided a mowing machine comprising a rotor mounted for rotation about an upwardly extending main axis and comprising a supporting member supporting a mowing element which is drivable in rotation via the rotor about an upwardly extending axis, the rotor comprising means permitting relative movement between the axis of the mowing element and the supporting member.

According to a fifth aspect of the present invention there is provided a mowing machine comprising a mowing element which comprises an endless element which is drivable about an upwardly extending axis, the mowing element extending over a wheel arranged on an upwardly extending drive shaft, the wheel and the drive shaft being mounted resiliently for movement relative to a frame of the machine.

For a better understanding of the present invention and to show how it may be carried into effect, reference will now be made, by way of example only, to the accompanying drawings, in which:

BRIEF DESCRIPTION OF THE DRAWINGS

FIG. 3 is a sectional view taken on the lines III—III in FIG. 2, FIG. 4 is a sectional view taken on the lines IV—IV in FIG. 2, FIG. 5 is a sectional view taken on the lines V—V in FIG. 3, FIG. 6 is an elevational view, partly in section, of a second embodiment of a mowing machine in accordance with the invention, FIG. 7 is an elevational view in the direction of the arrow VII in FIG. 6, and FIG. 8 is a sectional view taken on the lines VIII—VIII in FIG. 7.

DESCRIPTION OF THE PREFERRED EMBODIMENTS

Figure 1:
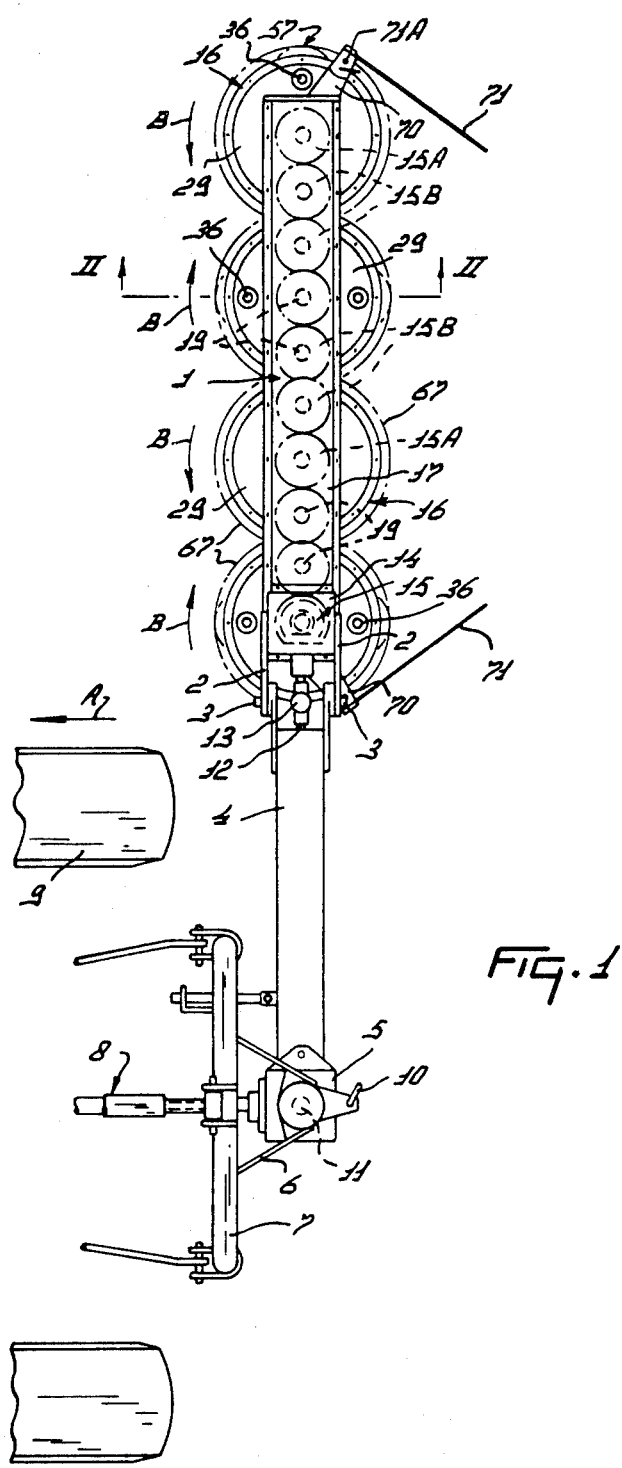
FIG. 1 is a plan view of a mowing machine in accordance with the invention attached to a tractor.

The mowing machine illustrated in FIG. 1 comprises a main frame beam 1 extending substantially transversely of the intended direction of operative travel of the machine, indicated by an arrow A. The beam 1 is connected near one end with two parallel plates 2, through which a pivotal shaft 3 passes in the direction A, this shaft 3 establishing a pivotal joint between the main frame beam 1 and an intermediate frame beam 4 which is in line with the beam 1. The beam 4 has, at the opposite end from the beam 1, a gearbox 5, which supports the beam 4 on a supporting frame 6 on the rear of a three-point trestle 7. During operation, the trestle 7 is coupled with the three-point lifting device 8 of a tractor 9. The frame 6 is held with respect to the gearbox 5 by a pin 10 which allows movement of the mowing machine from the operational position shown, in which it extends laterally of the tractor, to a transport position in which it lies behind the tractor. This is done by pivoting the machine through about 90° about an axis 11. The gearbox 5 is connected at the front, in a manner not shown in detail, with the power take-off shaft of the tractor, the gearbox 5 comprises a bevel gear transmission connected with a driving shaft 12 located in the beam 4, which is hollow. The shaft 12 is provided near the pivotal shaft 3 with a universal joint 14. The main frame beam 1 supports a gear box 14 connected with the plates 2 and fastened to the top of the beam 1. The gear box 14 is coupled with the driving shaft 12. The gear box 14 comprises a bevel pinion transmission and drives spur gears 15 located in the beam 1. The gear 15 located beneath the gear box 14 is the first of a sequence of ten identical pinions arranged side by side in a row, so that four pinions 15A of this row are located above rotors 16 and drive these rotors, there being two intermediate pinions 15B of the row disposed between each pair of pinions 15A such that every two adjacent rotors 16 rotate in opposite senses as indicated by arrows B in FIG. 1.

Figure 2:
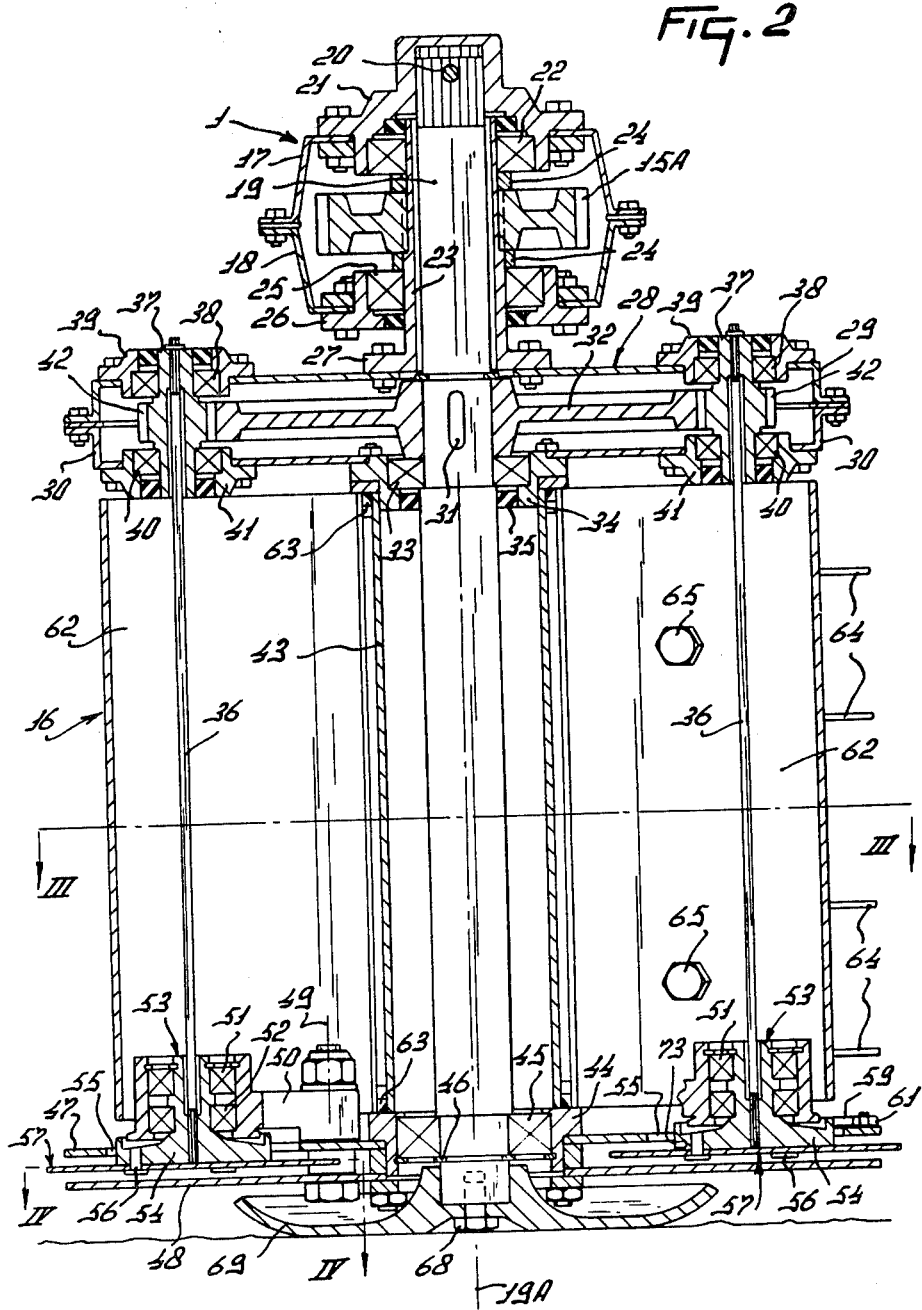
FIG. 2 is a sectional view of part of the mowing machine taken on the line II—II in FIG. 1.

FIG. 2 shows that the main frame beam 1 comprises a top plate 17 and a bottom plate 18, which are formed by pressing, interconnected by bolts. The plates 17 and 18 constitute an upper bearing housing or gear housing for the underlying rotor 16. The rotor 16 comprises a main shaft 19, which is rigidly secured at the top of the plate 17 to a bearing cover 21 by means of splines 20. The cover 21 is fixed to the top of the plate 17. The cover 21 accommodates a ball bearing 22 which surrounds a hollow shaft 23. The hollow shaft 23 is provided with splines for receiving the gear 15A, and a sleeve 24 is arranged between the gear 15A and the bearing 22. A further sleeve 24 is also located between the lower face of the gear 15A and a bearing 25 which is located near the lower side of the beam 1 and is accommodated in a cover 26 which is secured to the bottom of the plate 18. In this way the hollow shaft 23 is supported both at the top and at the bottom of the beam 1. The hollow shaft 23 is completely free for rotation with respect to the main shaft 19 and has a flange 27 near the bottom of the plate 18. The flange 27 is bolted to the top of a lower gear casing 28 having a circular outer periphery, as viewed in a direction parallel to the centerline 19A of the main shaft 19. As shown in FIG. 1, neighboring gear casings 28 have a diameter of some thirty-five centimeters such that they are spaced apart only by a small distance. Each gear casing 28 is arranged at a distance of thirty to fifty centimeters preferably some forty centimeters above the underside of the machine. The casing 28 comprises a top plate 29 and a bottom plate 30 which are formed by pressing and are bolted together at their peripheries. The casing 28 serves as on oil bath for a sun gear 32 which is rigidly connected by a wedge 31 with the main shaft of a planetary gear arrangement accommodated in the casing 28. Beneath the sun gear 32 there is a bearing 33 surrounded by a cap 35, which is connected with the bottom plate 30. An arrester ring 35 surrounds the main shaft 19 to seal the casing 28. The gear casing top plate 29 supports two drive shafts 36 which are disposed diametrically opposite each other, one on each side of the centerline 19A. The arrangement now to be described is symmetrical about a plane containing the rotary axis afforded by the centerline 19A and extending perpendicular to the line connecting the two drive shafts 36. Because of this, the arrangement on only one side of that plane will be described.

The shaft 36 is preferably made from spring steel and has a diameter of about six millimeters. At the top it is provided with splines co-operating with the top portion of a holder 37 which is supported on a bearing 38 connected by means of a bearing cap 39 with the top of the plate 29. The shaft 36 is conveniently mounted by passing it from above downwardly through the holder 37. At the bottom, the holder 37 is clear of the shaft 36 and is connected in a similar manner by means of a bearing 40 and a cap 41 with the bottom of the plate 30. Between the bearings 38 and 40 the holder 37 is formed with a pinion 42 which constitutes a planetary gear arrangement already referred to and meshes permanently with the sun gear 32. To the bottom of the cap 34 is welded a tube 43, which is coaxial with the shaft 19 and extends downwardly from the cap 34. The lower end of the tube 43 is welded to a ring 44, which surrounds a bearing 45 on the shaft 19, this bearings being axially fixed with respect to the shaft 19 by a locking ring 46. The ring 44 constitutes a fastening member for a supporting member comprising two parallel mowing element carriers 47 and 48, formed by top and bottom plates respectively. The two plates have a substantially identical, elliptical circumferential shape. The carriers 47 and 48 support a pivotal axis 49 afforded by a bolt passing through the plates, on which bolt a holder 50 is mounted for pivotal movement with respect to the carriers. The holder 50 is inclined rearwardly with respect to a radial line passing through the pivotal axis 49 and has a widened portion which constitutes a bearing housing for two bearings 51 and 52 one above the other. Between these bearings is journalled a mowing element 53 which is connected to the driving shaft 36 by splines co-operating with corresponding splines in a central portion 54 of the cutting member, which permit axial displacement of the shaft 36. The top portion of the central portion 54 between the bearings 51 and 52 is clear of the shaft 36. The central portion 54, as viewed in a direction parallel to the shaft 36, is substantially circular and is located in a recess 55 in the top plate 47. The lower side of the central portion 54 is provided with three pins 56 affording a bayonet connection for a cutter disc 57 (see also FIG. 4), which disc has a uniformly serrated edge forming teeth 58. The serrations of the edge are such that the deepest part of the serration, as shown in FIG. 3, coincides substantially with the periphery of the plate 47. The diameter of the disc 57 is preferably about fifteen centimeters and the relative positions of the two discs 57 are such that the overall diameter of the rotor 16 with the discs 57 is about forty-four centimeters. Since the disc 57 is located between the two plates 47 and 48, these plates constitute a guard member for the cutter disc. The pivotable arrangement on the shaft 49 permits the cutting member to move within the guard member by displacement of the flexible shaft 36. During this movement the lower portion of the shaft 36 can deflect owing to its shape, whereas the top portion of the shaft is fixed with respect to the rotor 16.

The plates 47 and 48 are symmetrical about a plane containing the two axes of shafts 36 with regard to the desired screening effect. As viewed on plane (FIG. 3) the operative portion of the disc 58 projects beyond the periphery of the locally arcuate disc 47 over an arc of preferably not more than 120° with respect to the direction of rotation of the roller indicated by the arrow B, this operative portion projecting, with respect to the arrow B, at the front and at the radially outer edge of the plate 47. The planetary gear drives the mowing element 53 in the direction of the arrows C, which corresponds at the periphery of the rotor with the arrow B. The disc 57 then moves beneath the plate 47 at a point where the periphery of the plate 47 curves away from the shaft 36, to form a slight cavity. The holder 50 has a projecting portion 59 which can turn with the holder 50 about the pivotal axis 49 between two stops 60 and 61 provided near the periphery of the plate 47, the central portion 54 then moving in the recess 55. This pivotal movement, resulting in resilient deflection of the shaft 36, is possible over an arc of preferably about 8°. Owing to initial stressing of the shaft 36, the portion 59 bears on the stop 61 in the operative position shown. In the deflected position, the disc is located, as viewed on plan, substantially wholly within the boundary of the guard member. The free end portion 59 then bears on the stop 60.

Between the gear casing 28 and the plate 47, above each mowing element 53, is a screen 62, which is fastened at the bottom by two tags 63 to the ring 44 and in a similar manner at the top side to the cap 34. The screen 62 is preferably made form sheet material and has a substantially trapezoidal cross-section, the broader side lying near the shaft 19 and the narrower side being located just beyond the widened portion of the holder 50. The screen 62 surrounds the widened portion of the holder 50 so that the holder 50 can turn unhindered about the pivotal axis 49 between the stops 60 and 61. The screen 62 protects the driving shaft 43 at least in the circumferential direction. The screen 62 also acts as a fastening member for two crop displacing members constituted by tines 64, which are positioned at regular intervals one above the other; they are preferably made from spring steel. Each pair of tines 64 is made from a single length of material, the central portion being fixed by a bolt 65 to the trailing face of the screen 62. Between the fastening portion and the free end, each tine 64 has one or more coils 66, the axis of which extends substantially parallel to the shaft 36. The tines 64 all have substantially equal lengths and, as viewed on plane, the free end of each tine 64 extends as far as the circular path 67 described by the discs 57 during rotation of the rotor 16.

To the lower end of the shaft 19 is fastened, by a bolt 68, a dish-shaped supporting disc 69, the bolt 68 being located in a central cavity. As viewed on plan, the supporting disc is substantially circular and, as shown in the sectional view of FIG. 2, its diameter is about 40% of the diameter of the disc 57.

FIG. 1 shows that the two ends of the frame beam 1 are provided each with a laterally inclined support 70 extending rearwardly with respect to the direction A, and to each support 70 is fastened a swath forming member 71. The swath forming members 71 are pivotable about respective upwardly extending pivotal axes 71A and can be adjusted and fixed by a fixing member in any one of two or more positions by turning it about the pivotal axis 71A. The two swath forming members 71 converge to the rear in the position shown.

The mowing machine described above operates as follows.

During operation the rotors 16 are driven from the power take-off shaft of the tractor through the driving shaft 12 and the pinions 15. The transmission ratio of the gear box 5 and of the gear box 14 is such that the pinions 15 preferably have a speed of about 1200 rev/min. The rotors 16 are driven at this speed in opposite senses as indicated by the arrows B. Since the gear casing 28 is rigidly secured to the rotor 16, the planetary gears 42 revolve around the sun gear 32, which is fixed with respect to the frame by its connection with the shaft 19. The diameters of the sun gear 32 and of the pinion 42 are chosen so that the speed of each driving shaft 36 is about 10,000 rev/min. Through the flexible shafts 36 this speed is transferred to the mowing elements 53. Owing to the very small thickness of the disc 57 (about two millimeters) the mowing element 53 is capable, at this very high speed, of performing an effective mowing operation. Owing to the possible pivotable movement of the mowing element 53 about the pivotal axis 49, the mowing element is protected against damage. If the mowing element strikes an obstacle, it will deflect against resilient force of the shaft 36 in the direction indicated by the arrow D in FIG. 3, thus moving into the space between the two protecting plates 47 and 48. Thus the mowing element can avoid the obstacle. After the obstacle has been passed, the lower portion of the shaft 36 and the mowing element will turn back in the direction opposite the arrow D owing to the centrifugal force on the mowing elements 53 and to the resilience of the shaft 36 so that it is again the operative position.

The construction described, with driving gear at a high level and with a comparatively long, flexible shaft between each mowing element and the driving gear, provides a driving mode in which reactive forces produced may be kept within limits owing to the deflectability of the mowing element.

The crop cut by the disc 57 is engaged almost immediately after cutting, before it has had time to fall over, by the tines 64 and displaced laterally to the rear by co-operation of the two screens 62 of each rotor 16. FIG. 1 shows that adjacent paths 67 overlap one another to some extent so that satisfactory co-operation between neighboring rotors 16 is achieved. The crop is thus slightly tedded and deposited airily, while, dependent upon their setting, the swath forming members 71 can deposit the crop in a sharply defined swath.

FIG. 4 illustrates how the disc 57 can be replaced in a simple manner. A wrench 72 is inserted into a recess 73 in the proximity of the central portion 54, while at the same time a wrench 74 is inserted into an aperture 75 in the disc 57. With these, the disc 57 sandwiched between the plates 47 and 48, can be turned with respect to the central portion 54 so that the disc 57 is released from the three pins 56 and can be removed. The insertion of a new disc 57 is performed in the reverse order of operations.

In the embodiment of the mower shown in FIGS. 6, 7 and 8, the machine comprises two sheet metal frame portions 76 and 77 which are disposed one above the other and are interconnected at the ends of the machine by upwardly extending sidewalls 78. On the top of the frame portion 76 at the end nearest the tractor is disposed an upwardly extending support 79 having a gear box 80 near the top. The gear box 80 accommodates a bevel pinion transmission and is connected at one side, like the gear box 14 of FIG. 1, with the driving shaft 12. From the gear box 80 the mower is driven through a shaft 81 which has a universal joint 82 and is drivably connected with a pinion 84 arranged on a stub shaft 83 and located in a gear box 85. The gear box 85 accommodates three identical pinions 84, 86 and 87 arranged in a row, the pinion 87 being arranged on a stub shaft 88 which is parallel to the stub shaft 83. The stub shaft 83 provides a pivotal axis for a carrier plate 89, which lies parallel to the gear box 85 and supports the lower end of the stub shaft 88. Between the carrier plate 89 and the gear box 85 there is sprocket or pulley comprising a wheel 90 which is arranged on the stub shaft 88, over which a mowing element 91 is guided. The mowing element 91 comprises an endless element 92 which may be a chain or belt provided at equal intervals with cutters 93. Viewed from a side, as in FIG. 8, the cutters 93, when they are at the front of the machine, project just beyond a guard member formed by the plate-shaped frame portions 76 and 77. The mowing element 91 is guided, at the end away from the tractor, over a wheel 94, which may be structurally the same as wheel 90 and is pivotably arranged in a similar manner wheel 90 by means of a carrier 95 on a pivotal shaft 96. The carriers 89 and 96 extend forwardly for some distance from the respective shaft 88 to the front and are interconnected near their front ends by a rod 97. The carriers 89 and 95 and the rod 97 form a parallelogram linkage. As shown in FIG. 7, the rod 97 is provided on the rear side with a tag 98 which is connected by a tensile spring 99 with the top face of the lower frame portion 72. The spring 99 pulls the carrier 89 during normal operation against a stop 100 as result of which the cutters 93 project out of the screen. However, the parallelogram can pivot rearwardly, with respect to the direction A, in the direction of the arrow E in FIG. 6 so that the cutters move to a position within the screen. At the end away from the tractor, the frame portion 76 is provided with a support 101 extending parallel to the support 79. The two supports hold coaxial stub shafts 102, and 103 which extend substantially horizontally and transversely of the direction A. The stub shaft 102 is drivably connected with the pinions in the gear box 80. The stub shafts 102 and 103 constitute fastening members for a reel 104, which is bounded by side plates 105. The side plates 105 constitute supporting members for four tine carriers 106, which are provided at regular intervals with tines 107, preferably made of spring steel, which, as shown, extend radially of the axis of the stub shafts 102 and 103, but which can be adjusted and fixed in a plurality of positions by means of a pin 108. Viewed on plan (FIG. 6) the tines trace a path extending to in front of the operative path of the mowing element 91, whereas viewed in the direction of movement (FIG. 7) the tines extend to just above the frame portion 76.

The mowing machine illustrated in FIGS. 6 to 8 operates as follows.

The mowing element 91 is continuously driven in circulation by the shaft 81 and the pinions 84, 86 and 87, the mowing element turning at the ends of the path about the wheels 90 and 94. The cutters 93 of the mowing element 91 are operative at the front of the mowing machine and are covered at the rear of the machine by the guard member. The cut crop is immediately transported by the reel 104 to the rear and at the same time it is slightly tedded. The parallelogram linkage including the wheels 90 and 94 permits the mowing element to turn within the guard member in the direction of the arrow E. In this way the mowing element can deflect away from obstacles so that damage of the mowing elements can be avoided. Under the action of the spring 99 the mowing element resumes its operative position after the abstacle has been passed. Since the tines 107 of the reel 104 are adjustable, the intensity of the tedding operation of the reel can be controlled.

Although various features of the mowing machines described and illustrated in the drawings, will be set forth in the following claims as inventive features, it is to be understood that the invention is not necessarily limited to these features and may encompasses other features which have been disclosed both individually and in various combinations.

Having described my invention, what I claim as new and desire to secure by Letters Patent of the United States is:

1. A mowing machine comprising a mowing element and an upwardly extending shaft affixed thereto which is drivingly rotatable about a substantially vertical longitudinal axis, said mowing element and said shaft where affixed thereto being movable between a first position and a second position wherein said axis of said shaft in said first position is not parallel to said axis of said shaft in said second position, and a guard member, said mowing element including an operative portion which, in said first position is disposed outwardly at least in part of the outer periphery of said guard member and in said second position is disposed within said outer periphery of said guard member.

2. A mowing machine which comprises a frame, a central rotatable member mounted from said frame whereby it rotates about a substantially vertical main axis, said rotatable member including at least two vertical resilient shafts which are spaced from said main axis and are rotatable around said main axis with said rotatable member, each said shaft having a further longitudinal axis and means being provided to rotate each said shaft about its respective longitudinal axis as it is rotated around said main axis, a mowing element being connected to the lower end of each said shaft whereby it is rotated by its respective shaft, and supporting means interconnected to said rotatable member for said cutting elements, said supporting means including holder means which are movable relative to said rotatable member whereby said shafts and said mowing elements are deflectable relative to said rotatable member.

3. A mowing machine comprising a mowing element which is drivingly rotatable about a substantially vertical axis and is movable between a first position and a second position, and a guard member, said mowing element including an operative portion which, in said first position is disposed only in part outwardly of the outer periphery of said guard member and in said second position is disposed within said outer periphery of said guard member, resilient means urging said mowing element into said second position wherein said axis of said mowing element is resiliently displaceable relative to said guard member to permit movement of said operative portion between said first and, second positions and wherein, as viewed in a direction parallel to said axis of said mowing element, only part of said mowing element projects in normal operations beyond said periphery of said guard member.

4. A mowing machine as claimed in claim 3, in which said guard member comprises two plates disposed one below and one above said mowing element and in which said two plates comprise a mowing element carrier which supports said mowing element.

5. A mowing machine as claimed in claim 3 in which said guard member is asymmetrical with respect to all planes containing said axis of said mowing element.

6. A mowing machine as claimed in claim 3, in which adjacent said operative portion of said mowing element the edge of said guard member is substantially arcuate, said arcuate edge being substantially centered on said axis of said mowing element.

7. A mowing machine as claimed in claim 3, in which in the region where the operative path of said mowing element is located within said periphery of said guard member, as viewed in plan, said periphery of said guard member curves away from said axis of said mowing element.

8. A mowing machine comprising a mowing element which is mounted on a drive shaft adapted to be rotatably driven about a substantially vertical axis, the upper portion of said drive shaft being movable within limits relative to the lower portion thereof.

9. A mowing machine as claimed in claim 8 in which said drive shaft is composed of a resilient material.

10. A mowing machine as claimed in claim 9 in which said drive shaft has a diameter of about six millimeters.

11. A mowing machine as claimed in claim 10 in which said shaft is supported at its lower end in a holder included in said mowing element which is pivotally connected to a guard member provided for said mowing element and wherein said drive shaft is adapted to be freely lifted upwardly relative to said mowing element and out of the machine.

12. A mowing machine as claimed in claim 11 in which said guard member comprises a supporting member which is part of a rotor mounted for rotation about a substantially vertical main axis, said pivotally connected holder for said drive shaft constituting means for permitting limited relative movement of said drive shaft relative to said supporting member.

13. A mowing machine comprising a rotor mounted for rotation about a substantially vertical main axis and comprising a supporting member rotated by said rotor about said main axis, said supporting member supporting a mowing element which is drivable in rotation from said rotor about a further substantially vertical axis which is movable within limits relative to said supporting member, and resilient means performing the function of resisting said relative movement between said further axis of said mowing element and said supporting member.

14. A mowing machine as claimed in claim 11 in which said supporting member comprises a pivotally connected holder, the pivotal movement of said holder being limited by stops included in said supporting member.

15. A mowing machine as claimed in claim 11 in which said further axis of said mowing element is biased during operation towards its normal operational position by centrifugal force.

16. A mowing machine as claimed in claim 15 in which said resilient means connects on one end to said supporting member and on the other to said mowing element, said further axis of said mowing element being displaceable against the urging of said resilient means.

17. A mowing machine comprising a rotor mounted for rotation about a substantially vertical main axis and comprising a supporting member supporting a mowing element which is drivable in rotation from said rotor about a further substantially vertical axis, said rotor comprising means for performing the function of providing relative movement between said further axis of said mowing element and said supporting member, said supporting member comprising a pivotally connected holder, the pivotable movement of said holder being limited by stops included in said supporting member, said holder receiving a pivotable drive shaft which is coupled with a further pivotable driven shaft.

18. A mowing machine as claimed in claim 17 in which said drive and driven shafts are coupled by a parallelogram linkage.

19. A mowing machine as claimed in claim 13 in which said mowing element comprises an endless element which is guided over a wheel arranged on a drive shaft, said wheel and said drive shaft being mounted resiliently on a frame of the machine.

20. A mowing machine comprising a mowing element which is drivenly rotatable about a substantially vertical axis and is movable between a first position and a second position, and a guard member, said mowing element including an operative position which, in said first position, is disposed only in part outwardly of the outward periphery of said guard member and, in said second position, is disposed within said outer periphery of said guard member, wherein said axis of said mowing element is displaceable relative to said guard member to permit movement of said operative portion between said first and second positions and wherein, as viewed in the direction parallel to said axis of said mowing element, only part of said mowing element projects in normal operations beyond said periphery of said guard member, a cutting member included in said mowing element which is mounted on an upwardly extending drive shaft, the upper portion of said shaft being movable within limits relative to the lower portion thereof, said shaft being composed of resilient material.

21. A mowing machine comprising a rotor mounted for rotation about a substantially vertical main axis and comprising a supporting member supporting a mowing element which is drivable in rotation from said rotor about a further substantially vertical axis, said rotor comprising means for performing the function of providing relative movement between said further axis of said mowing element and said supporting member, said further axis of said mowing element being biased during operation towards its normal operational position by centrifugal force, a resilient drive shaft being provided in said mowing element, said drive shaft urging said mowing element towards its normal position when the machine is stopped.

22. A mowing element in a mowing machine which includes a frame, the mowing element comprising an endless element which is adapted to be drivable about a substantially vertical axis, said mowing element extending around at least one wheel arranged on an upwardly extending drive shaft, and means mounting said wheel and said drive shaft resiliently for movement relative to said frame and in which crop displacing members are provided above said mowing element.

23. A mowing machine as claimed in claim 22 in which said crop displacing members are fastened to a screen located above said mowing element.

24. A mowing machine as claimed in claim 23 in which said screen at least partially encloses a drive shaft of said mowing element.

25. A mowing machine as claimed in claim 24 in which said mowing element is one of a plurality of like mowing elements, an associated screen being provided above each of said mowing elements.

26. A mowing machine as claimed in claim 24 in which said crop displacing members comprise tines and in which said tines are supported on a reel which is mounted for rotation about a substantially horizontal axis, said tines being mounted for rotation about said main axis of said rotor.

27. A mowing machine as claimed in claim 26, in which adjustment means are provided whereby the positions of said tines with respect to said horizontal axis about which they rotate are adjustable.

28. A mowing machine as claimed in claim 26 in which a screen is fastened to said rotor.

29. A mowing machine as claimed in claim 28, in which during rotation of said rotor in normal operation, said tines trail said screen.

30. A mowing machine as claimed in claim 27 in which said tines extend to the path described by the outermost part of said mowing element during rotation of said rotor.

31. A mowing machine as claimed in claim 30 in which said mowing element comprises a cutter disc and in which said disc is provided with serrations.

32. A mowing machine as claimed in claim 31 in which a guard member is provided for said disc, the peripheral portions of said disc between said serrations substantially coinciding, when viewed in plan, with the periphery of said guard member.

33. A mowing machine as claimed in claim 32 in which said disc has a diameter of about fifteen centimeters.

34. A mowing machine as claimed in claim 33 in which said rotor has a working speed of about twelve hundred revolutions per minute.

35. A mowing machine as claimed in claim 34 in which said mowing element has a working speed of about ten thousand revolutions per minute.

* * * * *